United States Patent [19]

Seki

[11] Patent Number: 5,765,014
[45] Date of Patent: Jun. 9, 1998

[54] ELECTRONIC COMPUTER SYSTEM AND PROCESSOR ELEMENT FOR PROCESSING IN A DATA DRIVEN MANNER USING REVERSE POLISH NOTATION

[76] Inventor: Hajime Seki, 4-38, Kita-machi, Dougo, Matsuyama, Ehime, 790, Japan

[21] Appl. No.: 637,560

[22] Filed: Apr. 25, 1996

Related U.S. Application Data

[63] Continuation of Ser. No. 117,037, filed as PCT/JP91/00296 Mar. 5, 1991 published as WO92/15960 Sep. 17, 1992, abandoned.

[51] Int. Cl.$^6$ .............................. G06F 15/82; G06F 15/16
[52] U.S. Cl. .............. 395/800.18; 395/377; 395/800.22; 395/800.25; 395/800.27; 364/231.9; 364/232.22; 364/931.03
[58] Field of Search ..................... 395/800, 377, 395/800.18, 800.22, 800.25, 800.27; 364/232.22, 231.9, 931.03

[56] References Cited

U.S. PATENT DOCUMENTS

| | | | |
|---|---|---|---|
| 4,334,269 | 6/1982 | Shibasaki et al. | 364/200 |
| 4,583,164 | 4/1986 | Tolle | 364/200 |
| 4,644,461 | 2/1987 | Jennings | 364/200 |
| 4,675,806 | 6/1987 | Uchida | 364/200 |
| 4,783,738 | 11/1988 | Li et al. | 364/200 |
| 4,847,755 | 7/1989 | Morrison et al. | 364/200 |
| 4,930,102 | 5/1990 | Jennings | 364/900 |
| 4,953,082 | 8/1990 | Nomura et al. | 364/200 |
| 4,953,083 | 8/1990 | Takata et al. | 364/200 |
| 4,972,314 | 11/1990 | Getzinger et al. | 364/200 |
| 5,021,945 | 6/1991 | Morrison et al. | 564/200 |
| 5,021,947 | 6/1991 | Campbell et al. | 364/200 |
| 5,029,080 | 7/1991 | Otsuki | 364/200 |
| 5,072,377 | 12/1991 | Asai et al. | 395/400 |
| 5,241,635 | 8/1993 | Papadopulos et al. | 395/375 |
| 5,333,320 | 7/1994 | Seki | 395/650 |
| 5,369,775 | 11/1994 | Yamasaki et al. | 395/800 |
| 5,388,214 | 2/1995 | Leiserson et al. | 395/200 |

FOREIGN PATENT DOCUMENTS

| | | |
|---|---|---|
| 1106229 | 4/1989 | Japan . |
| 1195540 | 8/1989 | Japan . |
| 1211126 | 8/1989 | Japan . |

*Primary Examiner*—Gopal C. Ray
*Assistant Examiner*—Valerie Darbe
*Attorney, Agent, or Firm*—Jones, Tullar & Cooper, P.C.

[57] ABSTRACT

An electronic computer system is formed of a control processor (1) and a plurality of processor elements ($3_1$–$3_n$). Each of the processor elements ($3_1$–$3_n$) has a control unit ($30_i$) that processes instructions issued by the control processor (1) in the SIMD manner, a data-driven processing unit ($31_i$) for performing arithmetic/logic operations and data transfering to a destination processor element of the processor elements ($3_1$–$3_n$) through a packet transmission network (22) in a data-driven manner and a local memory ($35_i$). The control processor (1) broadcasts instructions to set the data-driven processing unit ($31_i$) in each of the processor elements ($3_1$–$3_n$) contents that are to be performed in the data-driven manner. In each of the processor elements ($3_1$–$3_n$), operations in the data-driven processing unit ($31_i$) based on the data-driven manner are performed in parallel with setting of the data-driven processing unit ($31_i$).

6 Claims, 5 Drawing Sheets

| 4 1 i → | -4 1 1 i- | -4 1 2 i- | -4 1 3 i- |
|---|---|---|---|
| 4 2 i → | -4 2 1 i- | -4 2 2 i- | -4 2 3 i- |

| 7 1 i → | -7 1 1 i- | -7 1 2 i- | -7 1 3 i- |
|---|---|---|---|
| 7 2 i → | -7 2 1 i- | -7 2 2 i- | -7 2 3 i- |

| 9 1 i → | -9 1 1 i- | -9 1 2 i- | -9 1 3 i- | -9 1 4 i- | -9 1 5 i- |
|---|---|---|---|---|---|
| 9 2 i → | -9 2 1 i- | -9 2 2 i- | -9 2 3 i- | -9 2 4 i- | -9 2 5 i- |

| 5 1 i → | -5 1 1 i- | -5 1 2 i- | -5 1 3 i- | -5 1 4 i- |
|---|---|---|---|---|
| 5 2 i → | -5 2 1 i- | -5 2 2 i- | -5 2 3 i- | -5 2 4 i- |

$$\begin{bmatrix} 2 & 0 & 0 & 0 \\ 3 & 4 & 5 & 0 \\ 0 & 0 & 6 & 0 \\ 0 & 0 & 7 & 8 \end{bmatrix} \begin{bmatrix} 2 \\ 0 \\ -1 \\ 1 \end{bmatrix} = \begin{bmatrix} 4 \\ 1 \\ -6 \\ 1 \end{bmatrix}$$

ELECTRONIC COMPUTER SYSTEM AND PROCESSOR ELEMENT FOR PROCESSING IN A DATA DRIVEN MANNER USING REVERSE POLISH NOTATION

RELATED APPLICATIONS

This application is a continuation of U.S. patent application Ser. No. 08/117,037, filed as PCT/JP91/00296 Mar. 5, 1991, published as WO92/15960 Sep. 17, 1992, now abandoned.

FIELD OF THE INVENTION

The present invention relates to a computer system of a novel construction and a processor element used for the same system.

DESCRIPTION OF THE PRIOR ART

As a computer system in which a plurality of processors operate in parallel, there has been available one using Neuman type processors. Such type of system, however, has suffered from a problem that it becomes complex in synchronization among the processors as well as in communication control and that it cannot attain increased efficiency without taking into consideration the contents of jobs and the architecture of the processors in detail in preparing programs.

The present invention has been proposed with a view to solving the foregoing problems, and its essential object is to provide an electronic computer system having processor elements, wherein arithmetic/logic operations in each of the processor elements, data communications among the processor elements are performed in a data-driven manner (each operation is performed when required data are fully prepared), asynchronously, thereby achieving highly efficient computation.

SUMMARY OF THE INVENTION

In regard to hardware, the computer system according to the present invention comprises a control processor, a packet transmission network, and a plurality of processor elements connected mutually through the packet transmission network (the control processor will be referred to as "CP", the processor element as "PE", and the packet transmission network as "PTN", hereinafter in the specification); each PE has a control unit which is designed to process instructions issued by the CP in the SIMD (Single Instruction stream Multiple Data stream) manner, and a data-driven processing unit which is designed to perform arithmetic/logic operations and data transfers to destination PEs through the PTN in a data-driven manner (the control unit will be referred to as "CU", and the data-driven processing unit as "DPU", hereinafter in the specification); the system is so structured that the CP broadcasts instructions to the CU in each PE to set the DPU contents that are to be performed in the data-driven manner; and operations in the DPU based on the data-driven manner are performed in parallel with setting of the DPU.

The system according to the present invention may be so structured that the DPU in each PE has a means for performing arithmetic/logic operations defined by a program statement in the data-driven manner and a means for sending a packet including a variable identifier and its corresponding variable data to the DPU in the destination PE when the corresponding variable data is obtained.

The PE also herein proposed comprises an associative data memory which has cells each of which is designed to accommodate a variable identifier and a variable data, and which has an associative function of comparing a variable identifier transferred externally with variable identifiers each of which is accommodated in one of the cells of the associative data memory, and writing a data transferred together with the variable identifier transferred externally in each cell of the associative data memory matched by comparison, a data memory which has cells each of which is designed to accommodate either a variable identifier or a data, a stack memory, an instruction memory which has cells each of which is designed to accommodate contents of an operation, and an operation unit for performing arithmetic/logic operations (The associative data memory will be referred to as "ADM", the data memory as "DM", the stack memory as "SM", the instruction memory as "IM", and the operation unit as "OU", hereinafter in the specification); and the PE is so structured that the contents of the calculation defined by a program statement arranged in reverse Polish notation is set to be performed in the data-driven manner in the DPU, transformed into a set of individual operations whose contents are written in the IM and whose operand data are to be accommodated in the ADM/DM, by manipulating the SM each time a program element which composes the program statement is conveyed from the CU to the DPU, and that when an IM cell in which an operation is specified whose operand data are fully prepared in the ADM/DM is detected, the operation is performed.

The computer system according to the present invention may work in a manner analogous to the MIMD (Multiple Instruction stream Multiple Data stream) manner. Namely, the CP broadcasts instructions causing the CU in each PE, where instructions for setting the DPU and/or contents that are to be set are stored in its local memory, to process some members of the group consisting of the instructions for setting the DPU and the contents that are to be set stored in the local memory.

The computer system according to the present invention employs the following control structure: in broadcasting instructions to set the DPUs contents that are to be performed in the data-driven manner, the CP allocates an activity number to each part of the contents, whereas each PE shows the limit of activity numbers each corresponding to set contents unfinished in the DPU so that the CP may control the instruction stream to the PEs according to the limit of activity numbers each corresponding to set contents unfinished over all of the PEs.

To embody the above-mentioned control structure, the system according to the present invention may further comprise a plurality of control devices having a tree-connection, each PE shows the leaf control device connected directly the limit of activity numbers each corresponding to set contents unfinished in the DPU, each control device shows the control device connected upward the limit of activity numbers each corresponding to set contents unfinished over the PEs connected downward, and the root control device shows the CP the limit of activity numbers each corresponding to set contents unfinished over all of the PEs.

Important terms are listed below to clarify their meanings in the context of the present invention.

Variable identifier: Variable, in this embodiment, refers to a data item with fixed word length whose storage area is reserved in one of local memories each of which is a component of a PE. A variable identifier consists of two parts: the address of the PE having the local memory including the cell which is the storage area of the corresponding variable data and the address of the cell in the local memory.

Program element: Program element refers to a variable identifier, an immediate data or an operator indicative of an arithmetic/logic operation, a store operation or the like. Each program element is tagged so that a variable identifier, an immediate data and an operator are mutually discriminated: in the case of a variable identifier, tagging clarifies the difference between representation of an operand address and representation of a result storage address.

Program statement: Program statement refers to a series of program elements arranged meaningfully in reverse Polish notation. A program statement begins with a program element representing a variable identifier indicative of a result storage area, and terminates in the program element representing the operator "=" indicative of a store of a data. Each program element contained in a program statement representing a variable identifier shows either an operand address or a result storage address.

PREFERRED EMBODIMENTS OF THE INVENTION

Figure 1:
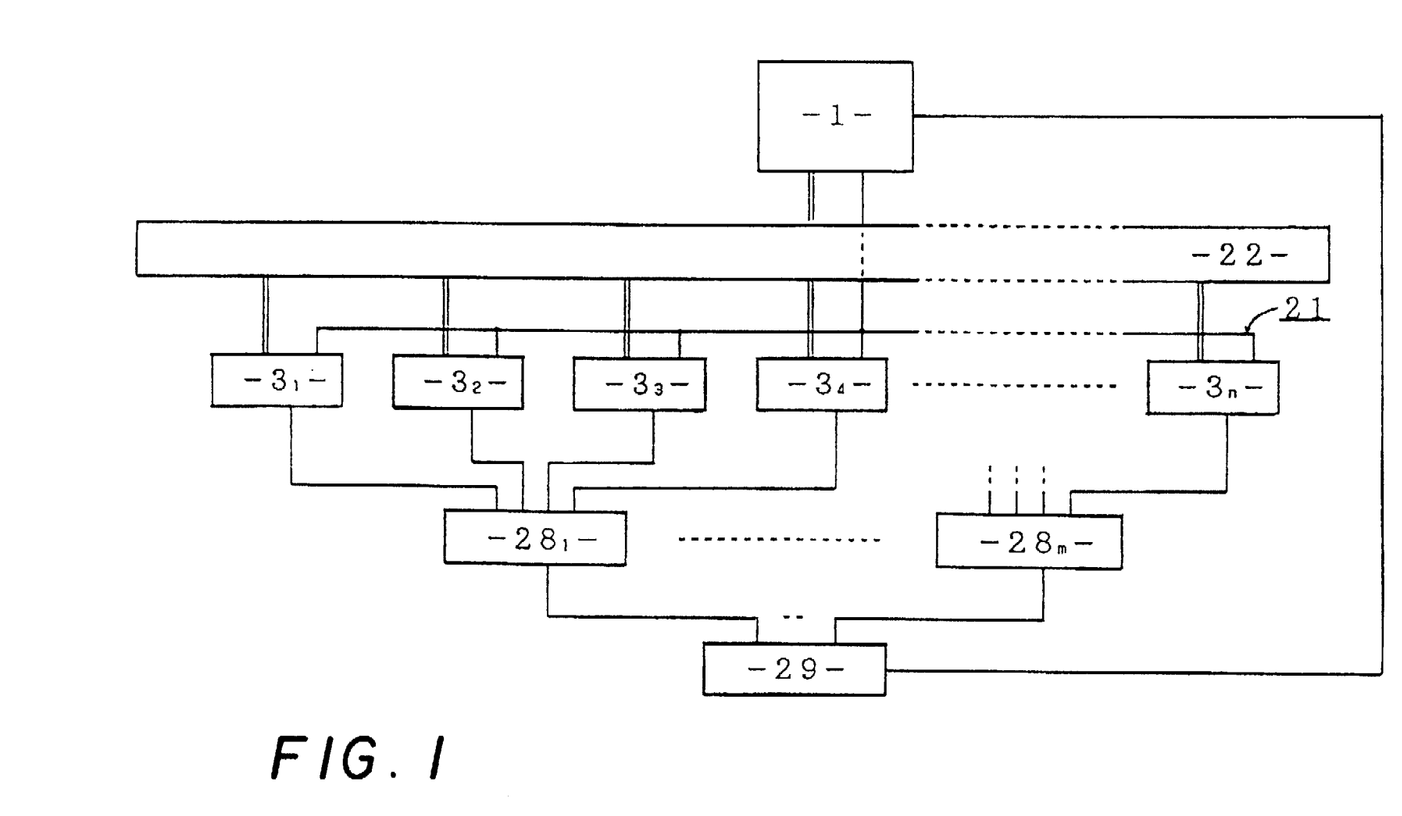
FIG. 1 is a block diagram showing a basic structure of the computer system according to the present invention.

FIG. 1 is a block diagram of the basic hardware structure of the system according to the present invention. Shown in FIG. 1 are a control processor (CP) 1, a broadcast network 21, a packet transmission network (PTN) 22, processor elements (PEs) $3_1$–$3_n$, later-described cluster control devices $28_1$–$28_m$, and a later-described global control device 29. (The cluster control device will be referred to as "CDD", and the global control device as "GCD", hereinafter in the specification)

In the system according to the present invention, the broadcast network 21 from the CP 1 is linked to each of the PEs $3_1$–$3_n$, and the PTN 22 is available for data communications among the PEs $3_1$–$3_n$. The broadcast network 21 may be replaced by a bus which has the link identical with that of the network 21.

In the system according to the present invention, each PE comprises a control unit (CU) which is designed to process instructions issued by the CP in the SIMD manner and a data-driven processing unit (DPU) which is designed to operate in the data-driven manner, and the DPU comprises an operation control unit which is designed to perform arithmetic/logic operations defined by a program statement in the data-driven manner and a communication control unit whereby a packet including a variable identifier, its corresponding variable data and the address of the destination PE as the header is designed to be sent out through the PTN when the corresponding variable data is obtained. (The operation control unit will be referred to as "OCU", and the communication control unit as "CCU", hereinafter in the specification)

The CP may issue instructions which are processed by the CU in each PE so that the DPU is set contents that are to be performed in the data-driven manner. Contents that are to be performed in the DPU in the data-driven manner are set in a manner that, in connection with arithmetic/logic operations and the like, the CU conveys, to the OCU, program elements which compose a program statement one by one, and that, in connection with a data transfer to a destination PE, the CU conveys, to the CCU, the variable identifier that is to be transferred and the address of the destination PE.

In this embodiment, to each program statement conveyed to the OCU in the corresponding PE, an activity number is allocated by the CP. Different activity numbers need not necessarily be allocated to different program statements. A non-negative increment added to the activity number which was allocated at the last time makes the activity number which is newly allocated. (If the activity number is to wrap around, an activity number allocated earlier is not necessarily smaller)

In each of the OCU and the CCU, any operation or any data transfer performable with required data fully prepared, is automatically performed in parallel with setting contents that are to be performed.

The computer system according to the present invention may work in a manner analogous to the MIMD manner. Namely, the CP broadcasts instructions causing the CU in each PE, where instructions for setting the DPU and/or contents that are to be set are stored in its local memory, to process some members of the group consisting of the instructions for setting the DPU and the contents that are to be set stored in the local memory.

Described below are the components which make up the system according to the present invention, and their behavior.

(I) Control Processor (CP)

The CP may broadcast instructions to the PEs through the broadcast network 21. These instructions are addressed directly to the CU in each PE, and are processed in the SIMD manner. On these instructions, the DPU may be set so that arithmetic/logic operations and data transfers to a destination PE will be performed in the data-driven manner.

As the CP issues instructions to the CU in each PE to set the OCU the contents of a program statement, the CP allocates an activity number to the program statements and notifies the PEs of the activity number. In this embodiment, same activity number is allocated to a plurality of program statements conveyed to respectively corresponding OCUs at the same time.

As the global control device (GCD) described later shows the CP the lower limit of activity numbers each corresponding to set contents of a program statement unfinished over all of the PEs, the CP can control the instruction stream to the PEs without damaging the coordinative relationship among operations. Namely, calculation of a variable data defined by a program statement to which an activity number over the lower limit of activity numbers shown by the GCD is allocated may be unfinished in some OCU. So, the above variable data cannot be accessed directly by instructions issued by the CP. Also, the CP must refrain from issuing instructions for setting the OCU to change the above variable data lest coordination of computation should be damaged.

In each PE, when any of the execution control memory, the ADM, the DM, the IM, and the transfer control memory, all described later, is about to overflow (the execution control memory will be referred to as "ECM", and the transfer control memory as "TCM", hereinafter in the specification), the PE so notifies the CP through global control structure described later, thereby causing the CP to stop issuing instructions for setting the DPU in each PE. When the above-described condition is removed, the PE so notifies the CP through the global control structure, thereby making the CP capable of resuming issuing instructions for setting the DPU in each PE.

(II) Processor Element (E)

Figure 2:
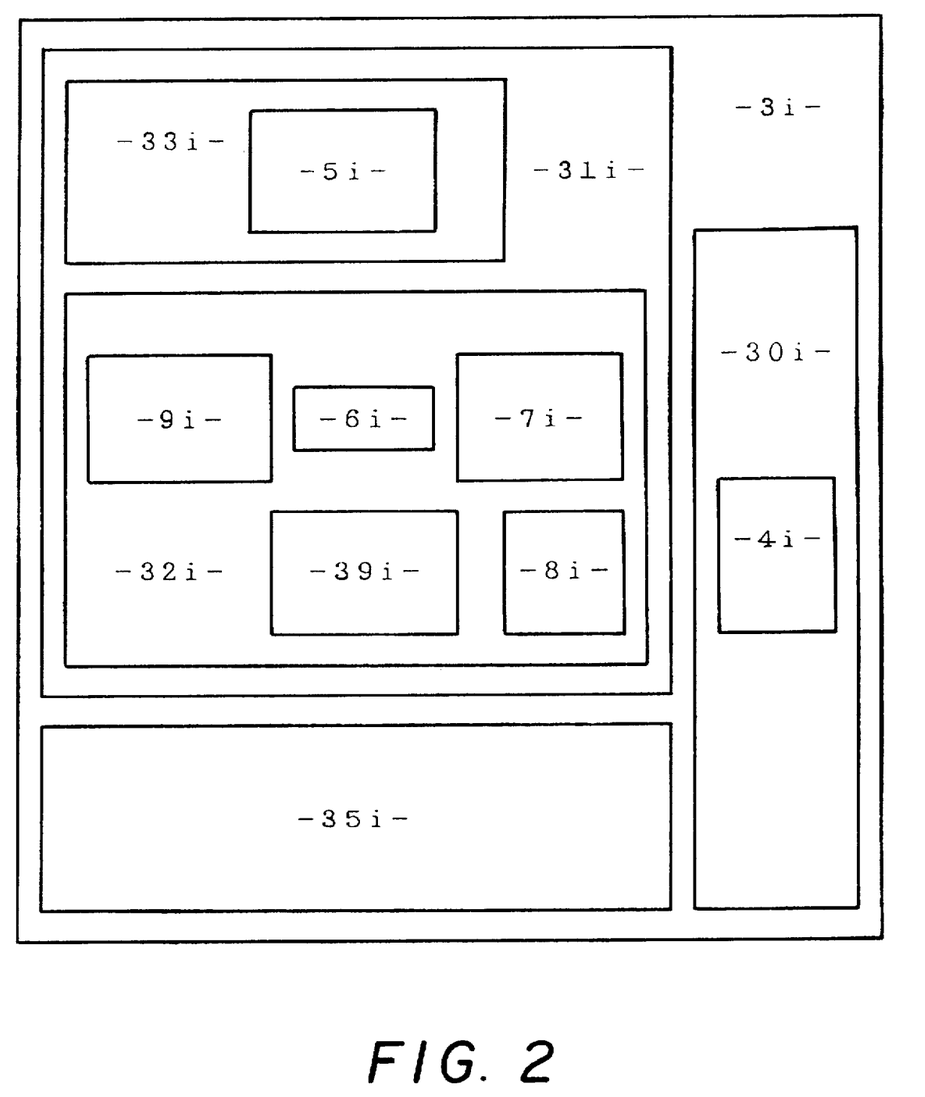
FIG. 2 is a block diagram showing a detailed structure of the processor element (PE) according to the present invention.

FIG. 2 is a block diagram showing a detailed structure of PE $3_i$ used in this embodiment, where $1 \leq i \leq n$. PE $3_i$ comprises control unit (CJ) $30_i$, data-driven processing unit (DPU) $31_i$ and local memory $35_i$: DPU $31_i$ is made of operation control unit (OCU) $32_i$ and communication control unit (CCU) $33_i$.

CU $30_i$ has execution control memory (ECM) $4_i$ described later. OCU $32_i$ has stack memory (SM) $6_i$, associative data memory (ADM) $7_i$, data memory (DM) $8_i$, instruction memory (IM) $9_i$ and operation unit (OU) $39_i$, all described later. CCU $33_i$ has transfer control memory (TCM) $5_i$ described later.

CU $30_i$ is linked to the broadcast network 21 from the CP 1 and has direct access to local memory $35_i$. Data communications among PEs $3_1$–$3_n$ are realized through the PTN 22, wherein the sender of a packet packet is one of t hie CCUs and the receiver of a packet is one of the OCUs in this embodiment.

(II-1) Control Unit (CU)

The CU in each PE, which is designed to process instructions issued by the CP in the SIMD manner, has a means for processing instructions optionally according to the internal status.

The CU in each PE is so designed that it can set the OCU and/or the CCU contents that are to be performed in the data-driven manner in the course of processing of instructions issued by the CP.

Besides, the CU in each PE is so structured that it has access to the local memory in two different ways. In the one way, the local memory is accessed explicitly by an instruction issued by the CP in the SIMD manner. In the other way, as operations in the DPU based on the data-driven manner entail, the local memory is accessed asynchronously. These two ways of local memory access are performed in parallel and independently of each other.

In the system according to the present invention, in order to ensure coordination among the instruction stream issued by the CP to the CU in each PE, the setting actions in the DPU in each PE and the operations based on the data-driven manner in the DPU in each PE, the CU in each PE has an execution control memory (ECM) for retaining an activity number and a variable identifier indicative of a result storage area for each program statement whose contents are already set but unfinished in the DPU.

Figure 3:
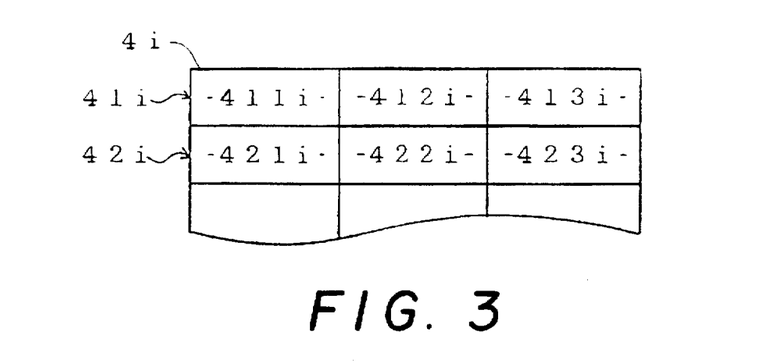
FIG. 3 illustrates an execution control memory described later in detail.

FIG. 3 illustrates the structure of the ECM in detail. Cells $41_i$, $42_i$, ... make up ECM $4_i$. Each ECM cell is made of an activity number field ($411_i$, $421_i$, ...), a variable identifier field ($412_i$, $422_i$, ...) and a control field ($413_i$, $423_i$, ...).

The ECM has an associative function. Namely, the ECM is addressable in terms of the content in each variable identifier field.

The control field of each ECM cell is where control information is accommodated, for example, indicating whether the cell is now in use, whether the corresponding variable data needs to be transmitted to the CCU, and the like.

Each PE is so structured that it ordinarily shows the cluster control device (CCD) connected directly the lower limit of activity numbers each corresponding to set contents of a program statement unfinished, namely, the lower limit of activity numbers written in the ECM. (If the activity number wraps around, the lower limit of activity numbers is not necessarily smallest)

The description that follows is about the functions the CU of the system of this embodiment has in connection with the DPU.

(X) The functions in connection with the OCU

The CU is designed to convey, to the OCU, program elements which compose a program statement one by one so as to set the OCU to perform arithmetic/logic operations in the data-driven manner. Each time a program statement is conveyed from the CU to the OCU according to instructions issued by the CP, the variable identifier indicative of the result storage area and the activity number allocated to the program statement are written in an unoccupied cell of the ECM.

In this embodiment, in order to ensure coordination in computation, a variable identifier specified in a program statement as a result storage area must belong in the local memory in the PE which is to perform the arithmetic/logic operations defined by the program statement. Besides, the same variable identifier as that indicative of a result storage area cannot emerge as that of an operand in a single program statement.

When the OCU completes the calculation of a variable data defined by a program statement, the CU is requested to store the result data in the local memory. Then, the CU stores the result data in the local memory. At the same time, the ECM cell in which the variable identifier indicative of the result storage area is written is freed. On this occasion, if the content in the control field of the ECM cell indicates that the corresponding variable data needs to be transmitted to the CCU, the variable data is transmitted together with the variable identifier. Thereupon, if the lower limit of activity numbers written in the ECM is changed, the updated lower limit of activity numbers is shown to the CCD directly connected to the PE.

(Y) The functions in connection with the CCU

So as to set the CCU to perform a data transfer to a destination PE, the CU is designed to convey, to the CCU, the variable identifier that is to be transferred and the address of the destination PE.

On this occasion, the variable identifier that is to be transferred is compared with the variable identifiers accommodated in the ECM by means of its associative function. Then, if a cell matched by comparison does not exist in the ECM, the CU accesses the local memory right away and transmits the fetched variable data to the CCU together with the variable identifier. Conversely, if a cell matched by comparison exists in the ECM, the CU sets the control field of the ECM cell matched by comparison so that, when the variable data corresponding to the variable identifier that is to be transferred is obtained in the OCU and the CU is requested to store the variable data in the local memory, the variable data, together with the variable identifier, will be transmitted to the CCU.

In this embodiment, in connection with a data transfer performed by the CCU, the variable identifier that is to be transferred must belong in the local memory in the PE which is to send the packet including the variable identifier. Besides, in this embodiment, it is assumed that, in the case of a data transfer to the OCU in the same PE based on the data-driven manner, a packet whose header indicates the same PE is sent from the CCU through the PTN to the OCU in the same PE.

(II-2) Operation Control Unit (OCU)

The OCU in each PE comprises a stack memory (SM), an associative data memory (ADM), a data memory (DM), an instruction memory (IM) and an operation unit (OU). The OCU is so designed that it performs arithmetic/logic operations defined by a program statement conveyed from the CU, in the data-driven manner.

The components of OCU $32_i$ are described below, where $1 \leq i \leq n$.

(a) Stack Memory (SM)

SM $6_i$ a has cells each of which is designed to accommodate either an ADM cell address or a DM cell address.

(b) Associative Data Memory (ADM)

Figure 4:
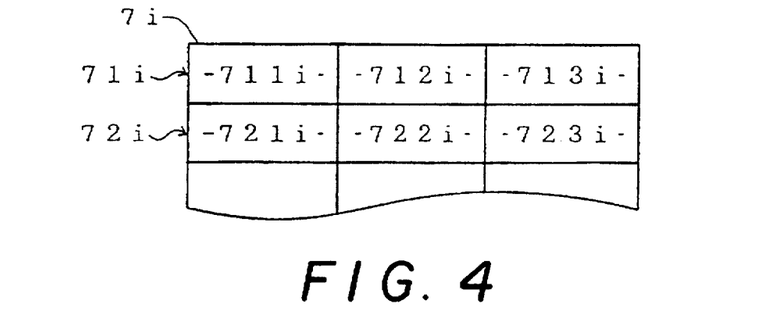
FIG. 4 illustrates an associative data memory in detail.

FIG. 4 illustrates the structure of ADM $7_i$ in detail. Cells $71_i$, $72_i$, . . . make up ADM $7_i$. Each ADM cell is made of a variable identifier field ($711_i$, $721_i$, . . . ), a variable data field ($712_i$, $722_i$, . . . ) and a control field. ($713_i$, $723_i$, . . . ).

The ADM has an associative function of comparing a variable identifier transferred externally with variable identifiers each of which is accommodated in one of the variable identifier fields of the ADM, and writing a data transferred together with the variable identifier transferred externally in the variable data field of each ADM cell matched by comparison.

The control field of each ADM cell is where control information is accommodated, for example, indicating whether the cell is now in use, whether an entry has been made in the variable data field of the cell, and the like.

(c) Data Memory (DM)

DM $8_i$ has cells each of which is designed to accommodate either a variable identifier or a data.

(d) Instruction Memory (IM)

IM $9_i$ is designed to accommodate contents of a program statement in the form of a set of individual operations whose operand data and result data are to be accommodated each in a cell of the ADM/DM.

Figure 5:
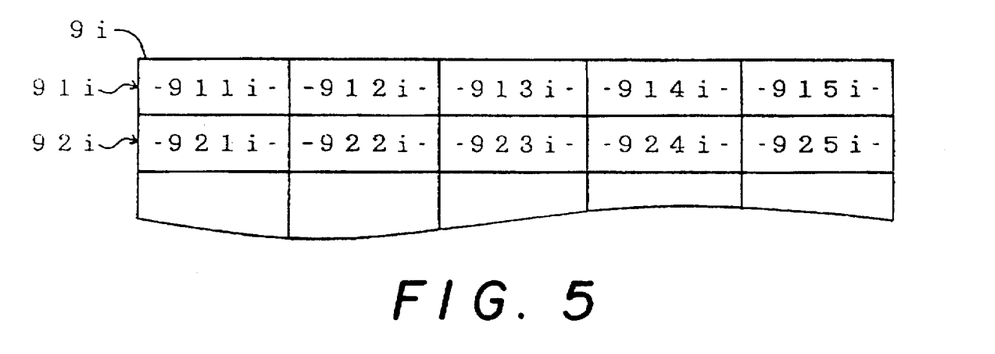
FIG. 5 illustrates an instruction memory in detail.

FIG. 5 illustrates the structure of IM $9_i$ in detail. Cells $91_i$, $92_i$, . . . make up IM $9_i$. Each IM cell is made of an operation field ($911_i$, $921_i$, . . . ), a first operand field ($912_i$, $922_i$, . . . ), a second operand field ($913_i$, $923_i$, . . . ), a result field ($914_i$, $924_i$, . . . ), and a control field ($915_i$, $925_i$, . . . ).

The control field of each IM cell is where control information is accommodated, for example, indicating whether the cell is now in use, whether an entry of a data has been made in the ADM/DM cell whose address is indicated in the first/second operand field of the same IM cell, and the like.

In this embodiment, it is assumed that each operator takes two operands or less. If the number of operand fields of each IM cell is increased, however, operators taking more operands may be utilized.

(e) Operation Unit (OU)

OU $39_i$ is so designed that it performs arithmetic/logic operations each of which is specified in an IM cell.

The OU may have the pipeline processing capability, or may be made up of a plurality of arithmetic/logic units which can operate in parallel.

Next, the action of the OCU in the PE is described below.

When a program statement is conveyed from the CU to the OCU, the OCU is set so that the operations defined by the program statement will be performed in the data-driven manner, by talking one of the following five different actions for each program element.

(1) If the program element represents a variable identifier indicative of a result storage area, the variable identifier indicative of the result storage area is written in an unoccupied DM cell, and the address of the DM cell in which the variable identifier indicative of the result storage area is written is pushed onto the SM.

(2) If the program element represents a variable identifier of an operand, an unoccupied ADM cell is secured, the variable identifier of the operand is written in the variable identifier field of the ADM cell secured, and the address of the ADM cell secured is pushed onto the SM.

(3) If the program element represents an immediate data, the immediate data is written in an unoccupied DM cell, and the address of the DM cell in which the immediate data is written is pushed onto the SM.

(4) If the program element represents an operator to generate a result data such as an arithmetic/logic operator, an unoccupied DM cell is secured for the result data, addresses of a cell of the ADM/DM, to the number of operands the operator needs, are popped from the SM, an unoccupied IM cell is secured, the code of the operator is written in the operation field of the IM cell secured, the addresses popped from the SM are written in the respective operand fields of the IM cell secured, the address of the DM cell secured for the result data is written in the result field of the IM cell secured, and the address of the DM cell secured for the result data is pushed onto the SM.

(5) If the program element represents an operator to generate no result data such as the operator "=" which means an assignment of a data (or a store of a data), addresses of a cell of the ADM/DM, to the number of operands the operator needs, are popped from the SM, an unoccupied IM cell is secured, the code of the operator is written in the operation field of the IM cell secured, and the addresses popped from the SM are written in the respective operand fields of the IM cell secured.

Described below is the behavior of the OCU in the PE based on the data-driven manner.

When a variable data, together with its corresponding variable identifier, is transferred through the PTN to the OCU in the PE, by virtue of the associative function of the ADM, the variable identifier is compared with variable identifiers each of which is accommodated in one of the variable identifier fields of the ADM, and the variable data is written in the variable data field of each ADM cell matched by comparison.

When an IM cell in which an arithmetic/logic operation is specified whose operand data are fully prepared in the ADM/DM is detected, the arithmetic/logic operation specified in the IM cell is performed in the OU, and then the result data is written in the DM cell whose address is indicated in the result field of the IM cell.

When an IM cell in which a store operation is specified whose operand data are fully prepared in the ADM/DM is detected, the CU is requested to store the data.

When the operation specified in an IM cell is completely performed, the IM cell in which the operation is specified and ADM/DM cells whose respective addresses are indicated in the operand fields of the IM cell are freed for later use.

In the embodiment herein, an unoccupied cell of the ADM is secured, each time a program element representing a variable identifier of an operand is conveyed to the OCU. The system according to the present invention, however, may be so structured that, when there is an ADM cell which is already accommodating the same variable identifier in its variable identifier field, that ADM cell is assigned to the program element.

Figure 7:
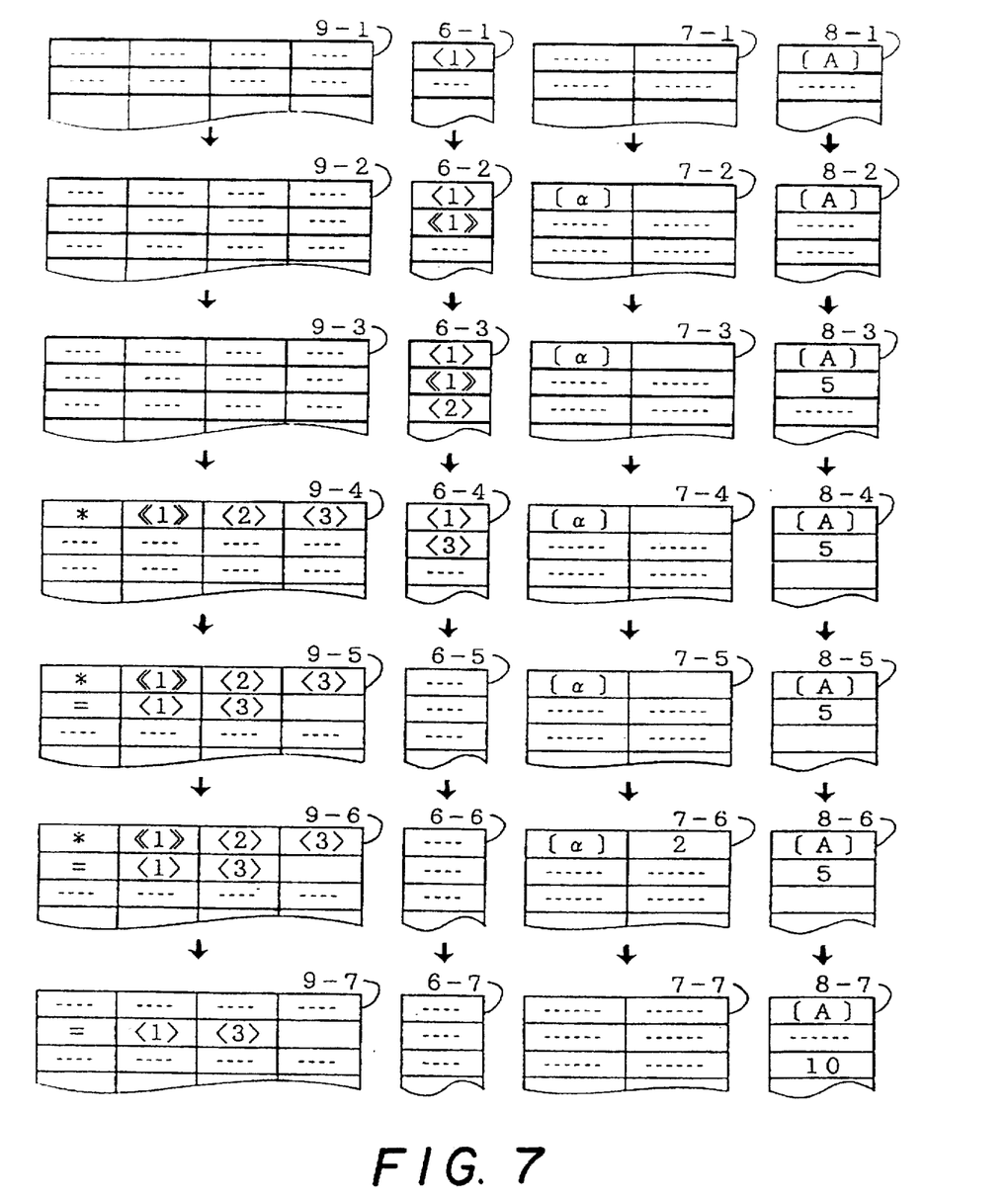
FIG. 7 shows contents in stack memory, associative data memory, data memory and instruction memory, in the course of action in a PE.

FIG. 7 illustrates behavior of the OCU in the PE. Referring to FIG. 7, the action is described further in detail.

The ADM and the IM shown in FIG. 7 are identical with the ADM in FIG. 4 and the IM in FIG. 5 respectively, except that control fields are omitted in FIG. 7. Each cell where broken lines are drawn in FIG. 7 is not in use. (In FIG. 7, as the action is in progress, each reference numeral is followed by a hyphen and a stepwise increasing number indicating the step of action, in order to refer to the contents in each component with progress.)

It is assumed, as an example, that a program statement, {[A],[a],5,*,=} (meaning [A]=[a]*5), is to be conveyed to the OCU.

When the program element representing variable identifier [A] indicative of a result storage area is conveyed to the OCU, the cell of address <1> of the DM 8-1 is assigned to variable identifier [A] (another unoccupied DM cell might be substituted for the DM cell of address <1>), variable identifier [A] is written in the DM cell, and simultaneously, address <1> of the DM cell is pushed onto the SM as in 6-1 in FIG. 7. Hereupon, each cell of the ADM, the DM and the IM is tagged with address, 1, 2, 3, . . . from top to bottom, in FIG. 7.

When the program element representing variable identifier [a] of an operand is conveyed to the OCU, the cell of address <<1>> of the ADM 7-2 is assigned to variable identifier [a] (another unoccupied ADM cell might be substituted for the ADM cell of address <<1>>), variable identifier [a] is written in the variable identifier field of the ADM cell, and simultaneously, address <<1>> of the ADM cell is pushed onto the SM as in 6-2 in FIG. 7.

When the program element representing immediate data '5' is conveyed to the OCU, the cell of address <2> of the DM 8-3 is assigned to immediate data '5' (another unoccupied DM cell might be substituted for the DM cell of address <2>), data '5' is written in the DM cell, and simultaneously, address <2> of the DM cell is pushed onto the SM as in 6-3 in FIG. 7.

When the program element representing operator '*' is conveyed to the OCU, the cell of address <3> of the DM 8-4 is secured for the result data which is to be generated by operator '*' (another unoccupied DM cell might be substituted for the DM cell of address <3>), two addresses <<1>>, <2> are popped from the SM (operator '*' is a dyadic operator), and the cell of address 1 of the IM 9-4 is secured for accommodating the content of the operation (another unoccupied IM cell might be substituted for the IM cell of address 1). Namely, the code of operator '*' is written in the operation field of the IM cell, addresses <<1>>, <2> popped from the SM are written in the first and second operand fields of the IM cell respectively, and address <3> of the DM cell secured for the result data is written in the result field of the IM cell. Address <3> of the DM cell is pushed onto the SM as in 6-4 in FIG. 7.

When the program element representing operator '=' which means an assignment of a data (or a store of a data) is conveyed to the OCU, two addresses <1>, <3> are popped from the SM (here, operator '=' is assumed to be a dyadic operator), and the cell of address 2 of the IM 9-5 is secured for accommodating the content of the store operation (another unoccupied IM cell might be substituted for the IM cell of address 2). Namely, the code of operator '=' is written in the operation field of the IM cell, and addresses <1>, <3> popped from the SM are written in the first and second operand fields of the IM cell respectively. Thus, the OCU is set so that the calculation, [A]=[a]*5, will be performed in the data-driven manner.

When data '2', together with variable identifier [a], is transmitted to the OCU, the associative function of the ADM allows data '2' to be written in the variable data field of the ADM cell which is accommodating variable identifier [a] in its variable identifier field, as in 7-6 in FIG. 7.

Then, the arithmetic operation specified in the cell of address 1 of the IM 9-6 becomes performable, so the arithmetic operation is performed in the OU 39. After that, the IM cell of address 1, the ADM cell of address <<1>> and the DM cell of address <2> are freed.

When the OU provides data '10' as the arithmetic operation result, data '10' is written in the DM cell of address <3>, which was indicated in the result field of the IM cell of address 1.

Then, the store operation specified in the cell of address 2 of the IM 9-7 becomes performable, so the CU is requested to store data '10' in the result storage area specified by variable identifier [A]. After that, the IM cell of address 2 and the two DM cells of address <1>, <3> are freed.

(II-3) Communication Control Unit (CCU)

The CCU in each PE is so designed that it performs data transfers to a destination PE through the PTN.

Each CCU is provided with a later-described transfer control memory (TCM). Retaining variable identifiers that are to be transferred and their respective destinations, the TCM allows each data transfer to be performed toward its destination when the variable data corresponding to the variable identifier that is to be transferred is obtained.

Figure 6:
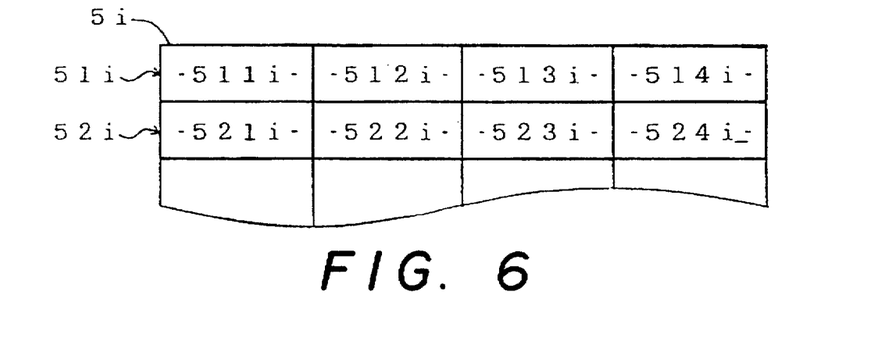
FIG. 6 illustrates a transfer control memory in detail.

FIG. 6 illustrates the structure of the TCM in detail. Cells $51_i$, $52_i$, . . . make up TCM $5_i$. Each cell is made of a destination field ($511_i$, $521_i$, . . . ), a transfer variable field ($512_i$, $522_i$, . . . ), a transfer data field ($513_i$, $523_i$, . . . ), and a control field ($514_i$, $524_i$, . . . ).

The TCM has an associative function of comparing a variable identifier transmitted to the CCU with variable identifiers each of which is accommodated in one of the transfer variable fields of the TCM, and writing a data transmitted together with the variable identifier transmitted to the CCU in the transfer data field of each TCM cell matched by comparison.

The control field of each TCM cell is where control information is accommodated, for example, indicating whether an entry has been made in the transfer variable field/the transfer data field of the cell, and the like.

Next, the action of the CCU is described below.

In the system according to the present invention, the CCU is set so that a data transfer to a destination PE will be performed in the data-driven manner, by writing the variable identifier that is to be transferred and the address of the destination PE, both of which are indicated by the CU, in an unoccupied cell of the TCM.

Each variable data that is to be transferred, together with its corresponding variable identifier, is designed to be transmitted asynchronously to the CCU on and after the above-mentioned setting action. When a variable data, together with the corresponding variable identifier, is transmitted to the CCU, by virtue of the associative function of the TCM, the variable identifier is compared with variable identifiers each of which is accommodated in one of the transfer variable fields of the TCM, and the variable data is written in the transfer data field of each TCM cell matched by comparison.

The content in a TCM cell in which an entry of a data has been made in the transfer data field is sent out through the PTN. Then, the TCM cell is freed.

In this embodiment, it is assumed that, in the case of a data transfer to the OCU in the same PE based on the data-driven manner, a packet is sent from the CCU through the PTN to the OCU in the same PE.

11

(III) Global Control Structure

By means of the global control structure, various control information of the PEs may be put together and shown/notified to the CP.

If the system according to the present invention has a large number of PEs, to embody the global control structure, a plurality of control devices having a tree- connection may be employed; the number of PEs and that of control devices directly connectable to each control device are limited. In this embodiment, for simplicity, 2-strata control structure comprising a plurality of cluster control devices (CCDs) $28_1$–$28_m$, and a global control device (GCD) 29 is employed, wherein each PE is directly connected to one of the CCDs and each CCD is directly connected to the GCD.

Each PE ordinarily shows the CCD connected directly the lower limit of activity numbers written in the ECM. Each CCD ordinarily shows the GCD the lower limit among the lower limits of activity numbers shown by the PEs connected directly. And, the GCD ordinarily shows the CP the lower limit among the lower limits of activity numbers shown by the CCDs. Thus, the CP is informed of the lower limit of activity numbers each corresponding to set contents of program statements unfinished over all of the PEs.

In each PE, when any of the ECM, the ADM, the DM, the IM, and the TCM is about to overflow, the PE so notifies the CP through the global control structure, thereby causing the CP to stop issuing instructions for setting the DPU in each PE. When the above-described condition is removed, the PE so notifies the CP through the global control structure, thereby making the CP capable of resuming issuing instructions for setting the DPU in each PE.

Besides, the global control structure may be utilized for other control information than those mentioned above to put together and show/notify the CP.

Referring now to an illustration of a multiplication between a sparse matrix and a vector, the action of the system according to the present invention is described below.

If a matrix is sparse, the contents of the matrix are efficiently stored by representing each row/column in terms of a tree. Trees are structured in the following manner. A root node is prepared for each row/column, and the leaf node prepared for each non-zero matrix element is connected to the two corresponding root nodes. In this illustration, binary trees are used, so fan-out nodes need to be prepared to connect more than two leaf nodes to a root node.

To each node which composes the trees, the fixed area in the local memory in a PE, which will be referred to as a record, is allocated. In this illustration, for simplicity, the number of the PEs is supposed to exceed that of the nodes. So, one record par PE is enough. (Expansion to a case where the number of nodes exceeds that of the PEs is not so complicated)

A record allocated to a root/fan-out/leaf node is referred to as a root/fan-out/leaf record respectively. A pointer in the direction from the root to a leaf is referred to as a forward pointer, and a pointer in the direction from a leaf to the root is referred to as a backward pointer.

Together with various data, a root record contains two forward pointers or less, a leaf record contains a backward pointer, and a fan-out record contains two forward pointers and a backward pointer.

To carry out the multiplication between a matrix represented in terms of trees and a column vector, each vector element is distributed to join with the matrix elements which belongs to the corresponding column through the tree representing the column, multiplication between each matrix element and the vector element distributed is performed, and, for each row, the multiplication results are put together through the tree representing the row.

12

Figure 8:
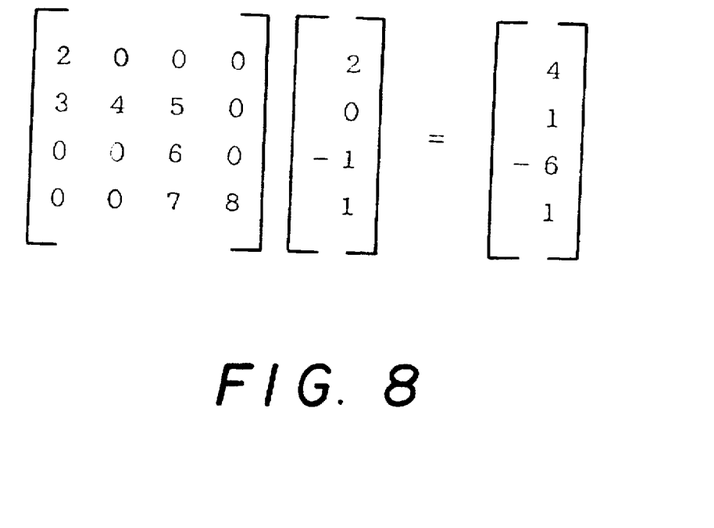
FIG. 8 illustrates a multiplication between a matrix and a vector, supposed for explaining the behavior of the computer system according to the present invention.
Figure 9:
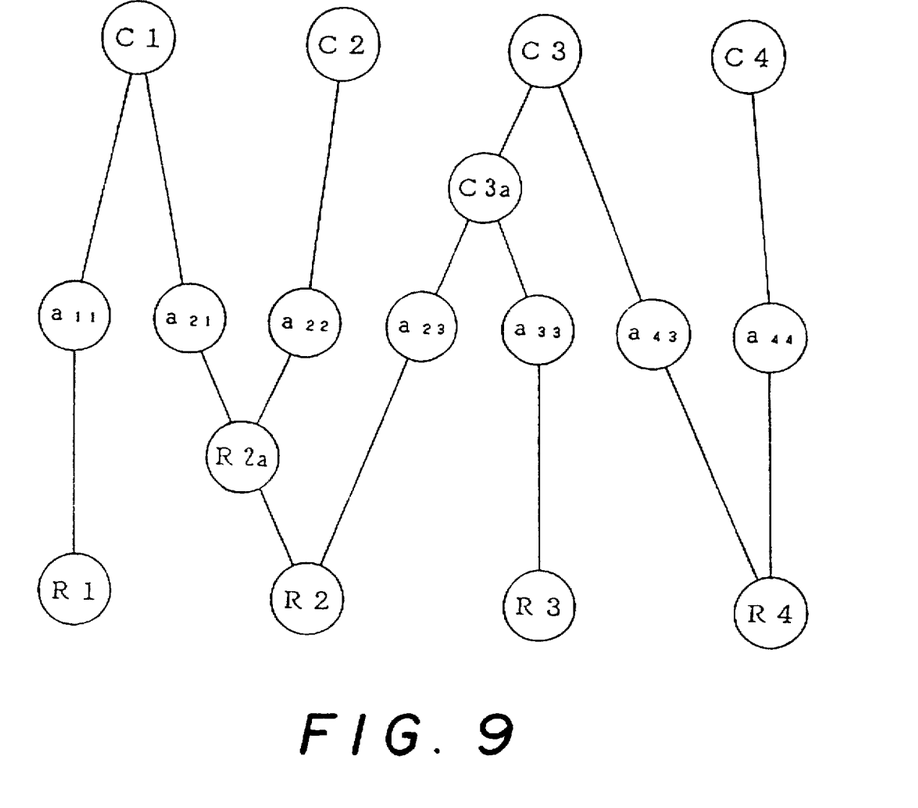
FIG. 9 shows representation of the matrix shown in FIG. 8 as binary trees.

As an example, the execution of the multiplication between the sparse matrix and the vector shown in FIG. 8 is described below. A tree representation of the sparse matrix is shown in FIG. 9. C1–C4 stand for root nodes prepared for columns 1–4 respectively, R1–R4 stand for root nodes prepared for rows 1–4 respectively, C3a and R2a stand for fan-out nodes, and $a_{11}$–$a_{44}$ stand for leaf nodes prepared for their respective matrix elements ($a_{ij}$ corresponds to the matrix element of <row i, column j>). To each of the above nodes, a record is allocated. Records, cells in each record and PEs will be referred to in the following manners. For example, the record allocated to node C1 will be referred to as [C1], the k-th cell in record [C1] as [C1]k, which is the expression of the corresponding variable identifier in this illustration, and the PE having the local memory accommodating record [C1] as PE [C1].

Each record is constructed as follows. In the first cell of each record, whether the record is now in use or not is indicated; in the case of in use, the difference among a root, a fan-out and a leaf is clarified, and the number of pointers stored in the record is also indicated; and further, in the case of a root record or a fan-out record, the difference between belonging to a row tree and belonging to a column tree is clarified. Each cell from the second cell through the fourth cell is where a pointer is stored. The cells below the fifth cell are used for accommodating various data or as work areas.

To execute the multiplication shown in FIG. 8, the CP broadcasts instructions to the PEs, and the CU in each PE processes the instructions, depending on the content in the first cell of the record, in the SIMD manner. In this way, the DPU in each PE may be set as follows:

| PE[C1]      | #03 | SEND $[C1]_k = 2$ to PE[$a_{11}$]       |
|-------------|-----|------------------------------------------|
|             | #04 | SEND $[C1]_k = 2$ to PE[$a_{21}$]       |
| PE[C2]      | #03 | SEND $[C2]_k = 0$ to PE[$a_{22}$]       |
| PE[C3]      | #03 | SEND $[C3]_k = -1$ to PE[C3a]           |
|             | #04 | SEND $[C3]_k = -1$ to PE[$a_{43}$]      |
| PE[C4]      | #03 | SEND $[C4]_k = 1$ to PE[$a_{44}$]       |
| PE[C3a]     | #02 | CALC $[C3a]_k = [C3]_k$                  |
|             | #05 | SEND $[C3a]_k = ?$ to PE[$a_{23}$]      |
|             | #06 | SEND $[C3a]_k = ?$ to PE[$a_{33}$]      |
| PE[$a_{11}$]| #01 | CALC $[a_{11}]_k = 2 * [C1]_k$           |
|             | #10 | SEND $[a_{11}]_k = ?$ to PE[R1]          |
| PE[$a_{21}$]| #01 | CALC $[a_{21}]_k = 3 * [C1]_k$           |
|             | #10 | SEND $[a_{21}]_k = ?$ to PE[R2a]         |
| PE[$a_{22}$]| #01 | CALC $[a_{22}]_k = 4 * [C2]_k$           |
|             | #10 | SEND $[a_{22}]_k = ?$ to PE[R2a]         |
| PE[$a_{23}$]| #01 | CALC $[a_{23}]_k = 5 * [C3a]_k$          |
|             | #10 | SEND $[a_{23}]_k = ?$ to PE[R2]          |
| PE[$a_{33}$]| #01 | CALC $[a_{33}]_k = 6 * [C3a]_k$          |
|             | #10 | SEND $[a_{33}]_k = ?$ to PE[R3]          |
| PE[$a_{43}$]| #01 | CALC $[a_{43}]_k = 7 * [C3]_k$           |
|             | #10 | SEND $[a_{43}]_k = ?$ to PE[R4]          |
| PE[$a_{44}$]| #01 | CALC $[a_{44}]_k = 8 * [C4]_k$           |
|             | #10 | SEND $[a_{44}]_k = ?$ to PE[R4]          |
| PE[R2a]     | #07 | CALC $[R2a]_k = [a_{21}]_k + [a_{22}]_k$ |
|             | #11 | SEND $[R2a]_k = ?$ to PE[R2]             |
| PE[R1]      | #08 | CALC $[R1]_k = [a_{11}]_k$               |
| PE[R2]      | #09 | CALC $[R2]_k = [R2a]_k + [a_{23}]_k$     |
| PE[R3]      | #08 | CALC $[R3]_k = [a_{33}]_k$               |
| PE[R4]      | #09 | CALC $[R4]_k = [a_{43}]_k + [a_{44}]_k$  | where, $k \geq 5$, data '2', '0', '−1', '1' have been beforehand written in cells $[C1]_k$ through $[C4]_k$ respectively, and each number which follows '#' indicates the order in which the above contents are set. Other orders that do not damage coordination in the calculation may be possible. Contents marked with the same number which follows '#' are simultaneously set in the SIMD manner. When the contents marked with #01 are set their respective DPUs, the data of each matrix element written in its corresponding leaf record is immediately loaded from the local memory and used.

In this illustration, each content that is set an OCU/a CCU is described after the word 'CALC'/'SEND'. In practice, the contents shown above should be presented in the form conformable to the hardware specification of the system according to the present invention. So, formulas should be converted in accordance with reverse Polish notation.

For the contents marked with #03 or #04, the required data are fully prepared from the first, so the data transfers are performed through the PTN immediately after the setting. On arrival of each of the packets to the destination PE, the operation defined by the content marked with #01 or #02 becomes ready to be performed in the destination PE. Then, on completion of the above operation, the result data is stored in the k-th cell of the record, and each data transfer set in the same PE becomes performable.

Thereafter, the contents marked with #05–#11 are performed in like manner. In the long run, data are stored in their respective cells as follows:

$[C3a]_k = -1$, $[a_{11}]_k = 4$, $[a_{21}]_k = 6$, $[a_{22}]_k = 0$, $[a_{23}]_k = -5$, $[a_{33}]_k = -6$, $[a_{43}]_k = -7$, $[a_{44}]_k = 8$, $[R2a]_k = 6$, $[R1]_k = 4$, $[R2]_k = 1$, $[R3]_k = -6$, $[R4]_k = 1$.

The contents in $[R1]_k$–$[R4]_k$ compose the result of the multiplication shown in FIG. 8.

INDUSTRIAL UTILITY

According to the present invention, efficient computation is achieved by running a plurality of PEs in parallel.

Furthermore, since each PE operates independently of the other PEs in the data-driven manner, the PEs may be arranged in a simple control structure. This is advantageous in that programming requires relatively less consideration for the control structure.

What is claimed is:

1. An electronic computer system comprising:

a control processor;

a packet transmission network; and a plurality of processor elements connected to said control processor and said packet transmission network, each processor element having a control unit that processes instructions issued by said control processor in SIMD manner, a data-driven processing unit, and a local memory, said data-driven processing unit having a means for performing calculation of a variable data defined by a program statement arranged in reverse Polish notation in a data-driven manner, and a means for sending a packet including a variable identifier and a variable data corresponding to said variable identifier through said packet transmission network to a destination processor element of said processor elements when said variable data corresponding to said variable identifier is obtained, wherein said control processor broadcasts instructions to said processor elements to set said data-driven processing unit in each of said processor elements contents that are to be performed in the data-driven manner, whereas, in each of said processor elements, operations in said data-driven processing unit based on the data-driven manner are performed in parallel with setting of said data-driven processing unit.

2. A method for executing jobs in the electronic computer system according to claim 1, wherein, in each of said processor elements, with instructions for setting said data-driven processing unit stored in said local memory beforehand, said control processor broadcasts instructions causing said control unit in each of said processor elements to process members of said instructions for setting said data-driven processing unit stored in said local memory so that said data-driven processing unit is set to operate in the data-driven manner.

3. The electronic computer system according to claim 1, wherein said control unit in each of said processor elements conveys program elements which compose a program statement one by one to said data-driven processing unit so that said data-driven processing unit is set to perform operations defined by said program statement in the data-driven manner.

4. The electronic computer system according to claim 1, each of said processor elements including and execution control memory with an associative function having cells each of which is designed to accommodate a variable identifier indicative of a result storage address in said local memory specified in a program statement whose contents are already set but unfinished in said data-driven processing unit, wherein, in each of said processor elements, said data-driven processing unit is set to perform a data transfer to a destination processor element of said processor elements; a variable identifier that is to be transferred is compared with variable identifiers each of which is accommodated in one of said cells of said execution control memory by means of said associative function; and following action is performed, if any cell of said execution control memory matched by comparison does not exist, said local memory is accessed right away, and then said data transfer is performed; and if a cell of said execution control memory matched by comparison exists, said data transfer is arranged so as to be performed when calculation of the data corresponding to said variable identifier that is to be transferred is completed in said data-driven processing unit.

5. The electronic computer system according to claim 1, further comprising a plurality of control devices having a tree-connection, each of said processor elements being directly connected to one of the leaf control devices of said control devices, and said control processor being directly connected to the root control device of said control devices, wherein, in broadcasting instructions from said control processor to set said data-driven processing unit in each of said processor elements contents that are to be performed in the data-driven manner, said control processor allocates an activity number to each part of said contents that are to be performed in the data-driven manner;

each of said processor elements shows one of said leaf control devices directly-connected thereto, the limit of activity members each corresponding to set contents unfinished in said data-driven processing unit;

each of said control devices other than said root control device shows its parent control device of said control devices the limit of activity numbers each corresponding to set contents unfinished over the descendant processor elements of said processor elements;

said root control device shows said control processor the limit of activity numbers each corresponding to set contents unfinished over all of said processor elements; and said control processor controls the instruction stream according to said limit of activity numbers each corresponding to set contents unfinished over all of said processor elements.

6. A processor element comprising:

an associative data memory having cells each of which is designed to accommodate a variable identifier and a variable data, and having an associative function of comparing a variable identifier transferred externally with variable identifiers each of which is accommodated in one of the cells of said associative data memory, and writing a data transferred together with said variable identifier transferred externally in each cell of said associative data memory matched by comparison;

a data memory having cells each of which is designed to accommodate either a variable identifier or a data;

a stack memory having cells each of which is designed to accommodate either an address of a cell of said associative data memory or an address of a cell of said data memory;

an instruction memory having cells each of which is designed to accommodate contents of an operation; and an operation unit for performing an arithmetic/logic operation specified in one of said cells of said instruction memory when operand data required for said arithmetic/logic operation are fully prepared, each either in said associative data memory or in said data memory, said processor element being designed to perform arithmetic/logic operations defined by a program statement arranged in reverse Polish notation in the data-driven manner after setting said associative data memory, said data memory and said instruction memory by manipulating said stack memory in one of the following manners for each program element which composes said program statement, for a program element representing a variable identifier indicative of a result storage area, said variable identifier indicative of said result storage area is written in an unoccupied cell of said data memory, and the address of said cell of said data memory in which said variable identifier indicative of said result storage area is written is pushed onto said stack memory;

for a program element representing a variable identifier of an operand, said variable identifier of said operand is written in an unoccupied cell of said associative data memory, and the address of said cell of said associative data memory in which said variable identifier of said operand is written is pushed onto said stack memory;

for a program element representing an immediate data, said immediate data is written in an unoccupied cell of said data memory, and the address of said cell of said data memory in which said immediate data is written is pushed onto said stack memory;

for a program element representing an operator to generate a result data, an unoccupied cell of said data memory is secured for said result data, an address/addresses of a cell of said associative data memory or said data memory, to the number of operands that said operator needs, is/are popped from said stack memory, the code of said operator, said addresses popped from said stack memory and the address of said cell of said data memory secured for said result data are written in an unoccupied cell of said instruction memory, and said address of said cell of said data memory secured for said result data is pushed onto said stack memory; and for a program element representing an operator to generate no result data, an address/addresses of a cell of said associative data memory or said data memory, to the number of operands that said operator needs, is/are popped from said stack memory, and the code of said operator and said addresses popped from said stack memory are written in an unoccupied cell of said instruction memory.

* * * * *